United States Patent [19]
Dunn

[11] Patent Number: 5,597,499
[45] Date of Patent: Jan. 28, 1997

[54] SEAL WIRE CONTROL FOR PACKAGING MACHINERY RESPONSIVE TO PRODUCT FLOW

[75] Inventor: Murray R. Dunn, Encinitas, Calif.

[73] Assignee: Shanklin Corporation, Ayer, Mass.

[21] Appl. No.: 414,714

[22] Filed: Mar. 31, 1995

[51] Int. Cl.⁶ ........................................... H05B 1/02
[52] U.S. Cl. .................... 219/243; 219/492; 219/518; 156/583.2; 53/477; 53/375.9
[58] Field of Search ..................... 219/243, 221, 219/492, 518, 388; 156/583.9, 583.7, 583.2, 583.1; 53/370.7, 373.7, 375.9, 377.7, 477, 479

[56] References Cited

U.S. PATENT DOCUMENTS

| | | | |
|---|---|---|---|
| Re. 30,010 | 5/1979 | Shanklin | 53/552 |
| 3,016,085 | 1/1962 | Gassner | 156/359 |
| 3,348,474 | 10/1967 | Virta et al. | 100/93 |
| 3,431,398 | 3/1969 | Wahle | 53/375.9 |
| 3,490,981 | 1/1970 | Shanklin . | |
| 3,679,518 | 7/1972 | Andler et al. | 156/351 |
| 4,219,988 | 9/1980 | Shanklin et al. | 53/550 |
| 4,354,095 | 10/1982 | Vries | 219/388 |
| 4,377,738 | 3/1983 | Berg | 219/490 |
| 4,378,486 | 3/1983 | Yunik et al. | 219/492 |
| 4,439,931 | 4/1984 | Mizuta | 34/546 |
| 4,464,219 | 8/1984 | Colombo et al. | 156/251 |
| 4,506,146 | 3/1985 | Rice et al. | 219/499 |
| 4,510,376 | 4/1985 | Schneider | 219/492 |
| 4,512,138 | 4/1985 | Greenawalt | 53/451 |
| 4,518,849 | 5/1985 | Rolland | 219/492 |
| 4,698,767 | 10/1987 | Wensel et al. | 219/388 |
| 4,901,506 | 2/1990 | Weyandt | 53/479 |
| 5,256,859 | 10/1993 | Nanos et al. | 219/492 |
| 5,321,230 | 6/1994 | Shanklin et al. | 219/492 |
| 5,451,288 | 9/1995 | Smith et al. | 219/492 |

FOREIGN PATENT DOCUMENTS 6-191518  7/1994  Japan ................................ 53/375.9

*Primary Examiner*—John A. Jeffery
*Attorney, Agent, or Firm*—Barlow & Barlow, Ltd.

[57] ABSTRACT

A seal wire heat control system for sealing thermoplastic film as adapted to control the duration of heat impulses applied to the sealing wire by remembering the past history of the sealing machine. The application of power to the sealing wire is provided by a series of power impulses, the duration of which is shortened incrementally as the apparatus continues to run and is lengthened incrementally when the apparatus sits at rest.

10 Claims, 4 Drawing Sheets

SEAL WIRE CONTROL FOR PACKAGING MACHINERY RESPONSIVE TO PRODUCT FLOW

BACKGROUND OF THE INVENTION

The present invention relates generally to a control circuit and more particularly, to a circuit for controlling the energy applied to a seal wire used in packaging machines for sealing plastic film.

Many packaging machines utilize a heated wire which is pressed against a pair of plastic film layers in a back-up pad to heat seal plastic wrappers. Typically, the film layers are sealed to one another and are cut by the heat and pressure of the wire. Too high a heat input into the film material can cause a number of problems such that the wire can have a build-up of melted film adhering to it, the back-up pad can burn out prematurely, and some films will smoke giving off noxious fumes forming a carbonaceous residue on the seal wire if the wire gets too hot. In the past, accurate temperature control has been difficult to obtain. One of the early techniques utilized to control the temperature of the sealing wire is seen in the Gassner U.S. Pat. No. 3,016,085, where the energy to the wire is controlled as a function of the linear speed of the web of film. Another approach is seen in the Virta, et al. U.S. Pat. No. 3,348,474, where the energy is applied during each machine cycle even when the sealing jaws are non-operative. Still further methods, as seen in the Rice, et al. U.S. Pat. No. 4,506,146, where the temperature control is based upon measurement of the changes in the resistance of the wire as it is heated. A further suggestion is seen in the Berg U.S. Pat. No. 4,377,738, where a power is applied until the seal wire element reaches a threshold temperature determined by the expanded length of the elements, and then repeated applications of voltage are made in response to the cooling and consequent contraction of the heating element as it cools below the threshold temperature. The Shanklin, et al. U.S. Pat. No. 5,321,230, anticipates some of the problems by reducing the time of the power impulse as the machine continues to run, and then returning the impulse to its long start-up time when the machine shuts down.

It often happens, however, that the packaging machine does not operate with the packages coming through at a constant rate. Often the line is abruptly stopped and then started again or sometimes, the packages are irregularly spaced so that the packaging machine will have to stop intermittently to wait for product. Essentially, the prior art systems run into errors in trying to properly control temperature to meet the varying rates of production, the intermittent operation, and the cold start-ups that are common with the operation of packaging machinery. Each of the prior art patents has problems when in a packaging line environment. The Gassner U.S. Pat. No. 3,016,085 is designed to control sealing element temperature for longitudinal seals in film as it passes by the sealing wire. In the case of transverse seals, the film speed is meaningless because there is no movement of the film past the seal wire during the sealing process and the Gassner apparatus can not be used. The Virta U.S. Pat. No. 3,348,474 depends upon the machine cycling continuously to apply an impulse of energy for each machine cycle. The Virta apparatus will not work in a machine that merely waits (at rest) for the next product to arrive.

The Rice et al U.S. Pat. No. 4,506,146, would appear to be a theoretically correct approach to the problem since the temperature of the seal wire will always be maintained the same as measured by the resistance of the wire. In practice, however, it is a troublesome device. The resistance of the wire is very low and the change in resistance due to change in temperature of the wire is minuscule. Thus, any change in resistance of the entire sealing system, such as might be introduced by varying temperature in the transformer, corrosion in the connections, or minute changes in sensitivity or calibration of the sensing system, will interfere with the proper temperature control of the seal wire. The temperature control in the Berg U.S. Pat. No. 4,377,738, is dependent entirely upon maintaining a proper distance between the ends of the heated sealing element. Thus, as the sealing wire stretches due to repeated heating and cooling cycles, the set temperature of the sealing wire will change. Furthermore, expansion of the sealing arm on the machine as it heats up during operation can also change (increase) the operating temperature of the sealing wire.

The prior Shanklin et al. U.S. Pat. No. 5,321,230 overcomes some of the problems involved in other prior art. It is not dependent upon the resistance of the wire, nor is it dependent upon accurately measuring the length of the wire, and the duration of the heat applied to the sealing wire is shortened as the machine continues to run after a cold start. Some difficulty has been experienced, however, with intermittent product flow, since a short absence of product would return the time of voltage impulse to its highest setting. If the package rate was rather intermittent, the seal wire would be returned frequently to its highest setting. Therefore, long impulses of power would be repeatedly applied to the seal wire anytime there were significant gaps in product flow, thereby overheating the seal wire and seal jaw. This can cause melting or burning of the plastic film and can cause the jaw to be coated improperly with plastic residue from the film.

SUMMARY OF THE INVENTION

Two factors determine the operating temperature of an impulse sealing wire. These are power across the wire and time of application of this power. The present invention proposes to vary the time that power is applied to the seal wire in steps. The steps would decrease to shorter and shorter periods as the machine makes seals. Likewise, if the machine sits idle, the time period that the voltage is applied to the seal wire would back up to longer and longer increments. The machine operator can determine the sealing temperature of the wire by increasing or decreasing the power level across the wire manually. The apparatus of this invention will hold the temperature automatically regardless of the sealing rate of the machine, and regardless of intermittent flow of product through the machine.

Essentially then, when the machine with the seal wire starts up with the seal jaw cold, a relatively long impulse of power is needed across the seal wire to bring it up to temperature to make a seal. The control system, therefore, supplies power in the described embodiment for a duration of one second. If the machine continues to run and the next product arrives, for example, in eleven seconds or less, the next power will be applied for nine tenths of a second. If the machine continues to run at a rate of sealing at which the time between seals becomes shorter and shorter, the power impulse will be applied to the seal wire in shorter and shorter increments. On the other hand, if the product does not arrive within a predetermined amount of time, the control system will back up in steps to longer and longer increments. The longer the machine sits idle, the more steps back the apparatus will make, and thus the longer will be the duration of the next impulse of power to the seal wire. Thus, the control apparatus senses how frequently and how recently heat is applied to the seal wire, and it adjusts the duration of the power impulse longer or shorter as required to deliver enough heat to the wire to make a seal without delivering too much heat and causing the aforementioned sealing problems.

In view of the fact that the control apparatus can keep track of the spacing between seal jaw operations, what is essentially occurring is that the heating impulse applied to the seal wire will be approximately the same for each minute of operation. Stated another way, during the operation of the machine, the impulse time multiplied by the number of seals made per minute (rate of sealing) will be nearly constant regardless of the speed packages are fed to the machine. For seal wire power settings normally used, the impulse time has been found to be approximately 8% of the total time regardless of package speed, but this can vary for different machines. The incremental control system of the instant invention thus automatically compensates for high and low speed operation of the machine, and it also compensates for steady or intermittent operation of the machine to always provide the proper duration of power impulse to the sealing wire to produce good seals without overheating.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figures 1, 1A:
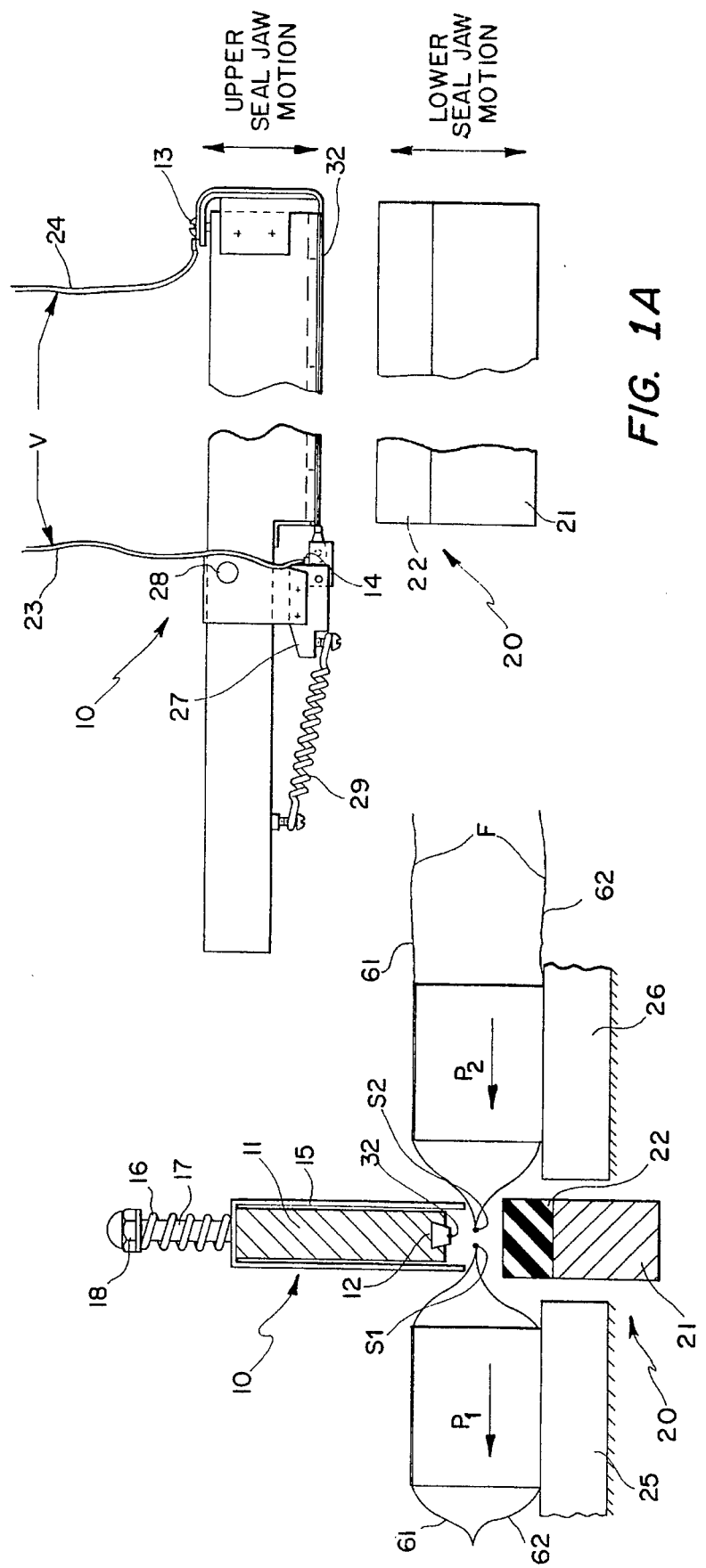
FIG. 1 is a schematic cross section of a typical seal jaw with product supports shown.
FIG. 1A is a side view of the mechanism of FIG. 1 without the supports and clamps.

With reference to FIG. 1 there is illustrated a typical seal jaw 10, and a mating jaw assembly 20. Seal jaw 10 is essentially composed of the seal bar 11 which has set therein at 12 an insulator carrying a seal wire 32. A film clamp 15 prevents the hot seal wire 32 from coming into contact with the packaging film until the seal jaw is fully closed. The mating jaw 20 is composed of the support bar 21 and an elastomeric pad 22.

Packages $P_1$ and $P_2$ are wrapped in a continuous web of film F having an upper layer 61 and a lower layer 62. As well known to those skilled in the art, the sealing mechanism seals the upper film layer 61 to the lower film layer 62 while simultaneously severing the package $P_1$ from $P_2$.

As the term "seal wire" is used in this specification, it includes many cross-sections of resistance material in addition to "round"; such as "tapered", "flat", "half round", "triangular", "oval", and so forth. As seen in FIG. 1A the seal wire is illustrated as being mounted in the jaw with the seal wire 32 attached by a fixed screw 13, while the movable end is attached to terminal 14. Terminal 14 is fastened to a moveable carrier system 27, which is free to pivot about pivot pin 28 in response to a constant tension applied by the extension spring 29. When voltage is applied across the seal wire the wire heats up and expands in length. The moveable carrier system 27 as illustrated, maintains the wire taunt.

Figure 3:
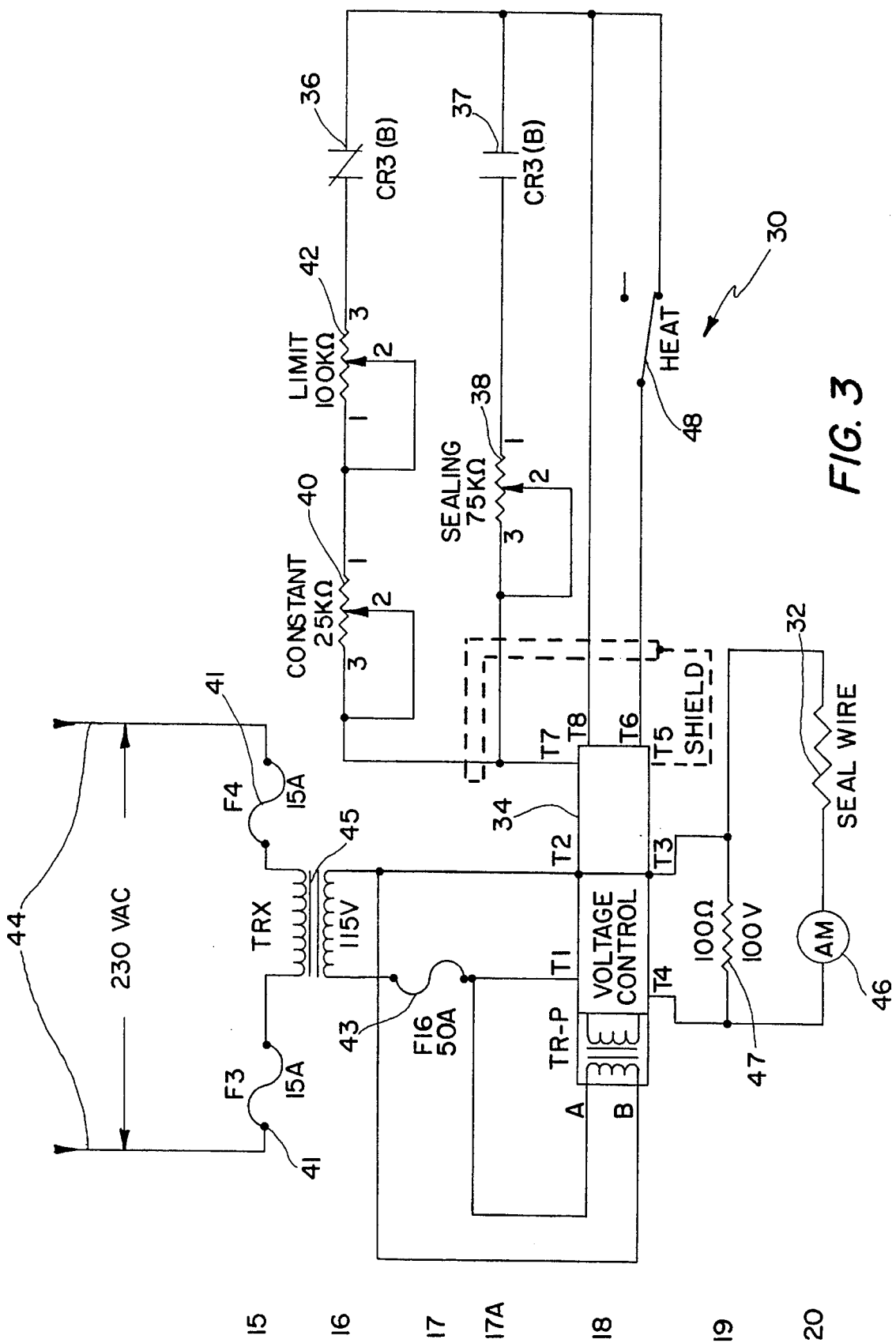
FIG. 3 is a schematic wiring diagram of the seal wire control circuit of the present invention.

It is very essential in the industry to maintain good strong seals and this means controlling the temperature of the wire during a variety of operating conditions. In order to achieve the proper heat on the wire reference is made first to FIG. 3 where the basic heat control circuit 30 is illustrated. This typical circuit imposes two voltages on the seal wire; a constant voltage when the machine is idling and a sealing voltage when the machine is running. The seal wire 32 is in series with an ammeter 46 and the power input to the seal wire is essentially controlled by an SCR voltage control 34. The output of power to the seal wire 32 is controlled by the resistance across terminal T6 and T7 of the SCR voltage control 34. This resistance is determined by the constant, limit, and sealing potentiometers 40, 42 and 38 respectively. As is known with controls of this nature, the lower the resistance the higher the power output of the SCR control. The constant and limit potentiometers are connected in series and their resistance is accordingly additive. Thus, the limit potentiometer 42 is set for the maximum safe constant (continuous) operation of the seal wire 32 when the constant potentiometer 40 is set for maximum heat, which would equate to zero resistance setting of potentiometer 40. Constant heat potentiometer 40 is set to deliver the proper power to the seal wire to keep it warm during the time when seals are not being made. Sealing heat potentiometer 38 is set to deliver the proper power to the seal wire during the sealing cycle of the machine.

Normally, under idling conditions the potentiometers 40 and 42 provide a low heat input to the seal wire 32 to prevent it from returning to room temperature. This permits faster start up of the machine. When seal heat is called for, the normally closed contacts 36 open and the normally open contacts 37 close, transferring control of the seal wire voltage from potentiometers 40 and 42 to the sealing potentiometer 38 whose setting would normally be for a lower resistance than the series connected potentiometers 40 and 42, thereby providing more heat to the wire during the sealing cycle.

Figure 2:
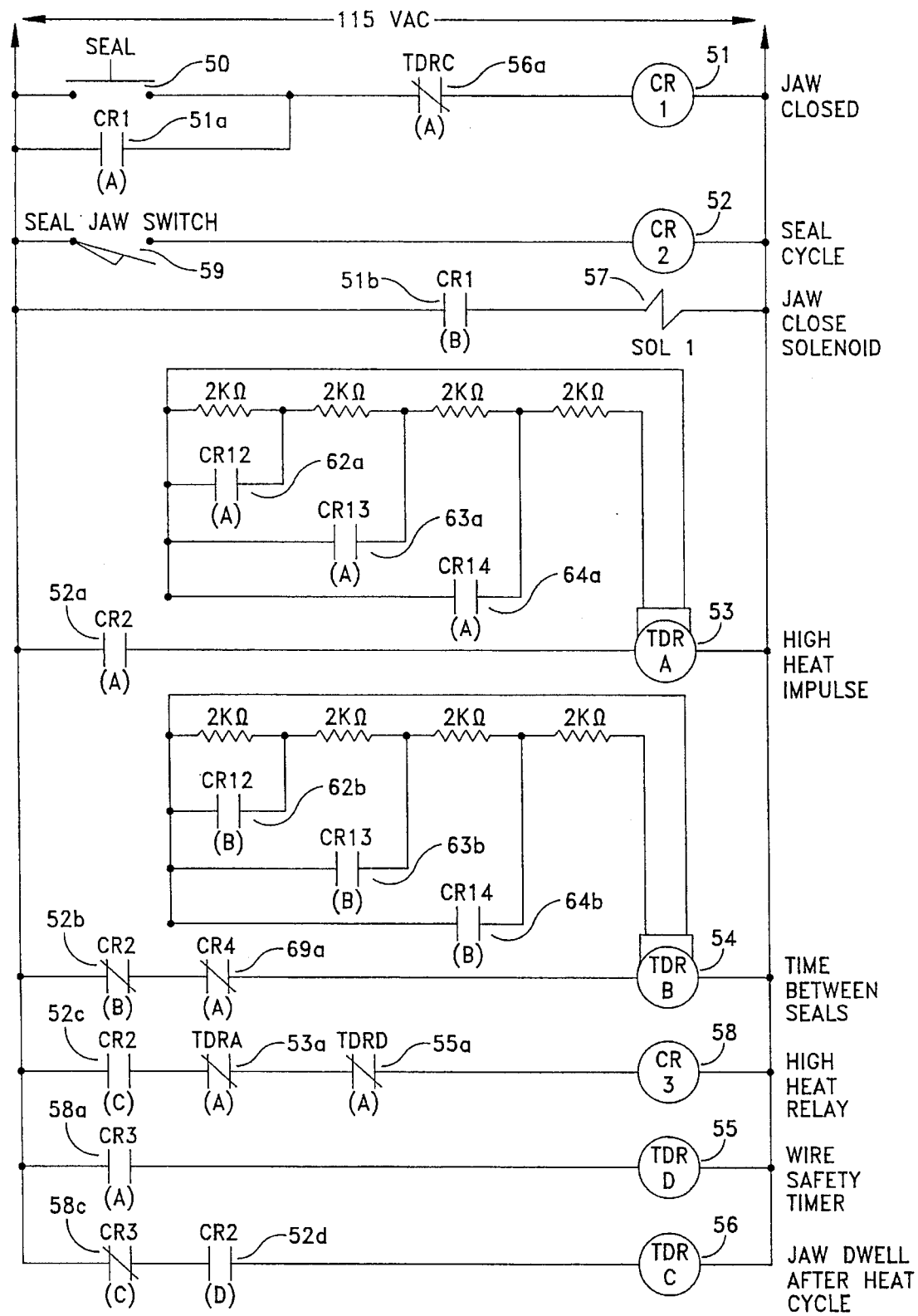
FIG. 2 is a ladder diagram illustrating the operation of the circuit of the present invention using relay logic.
Figure 4:
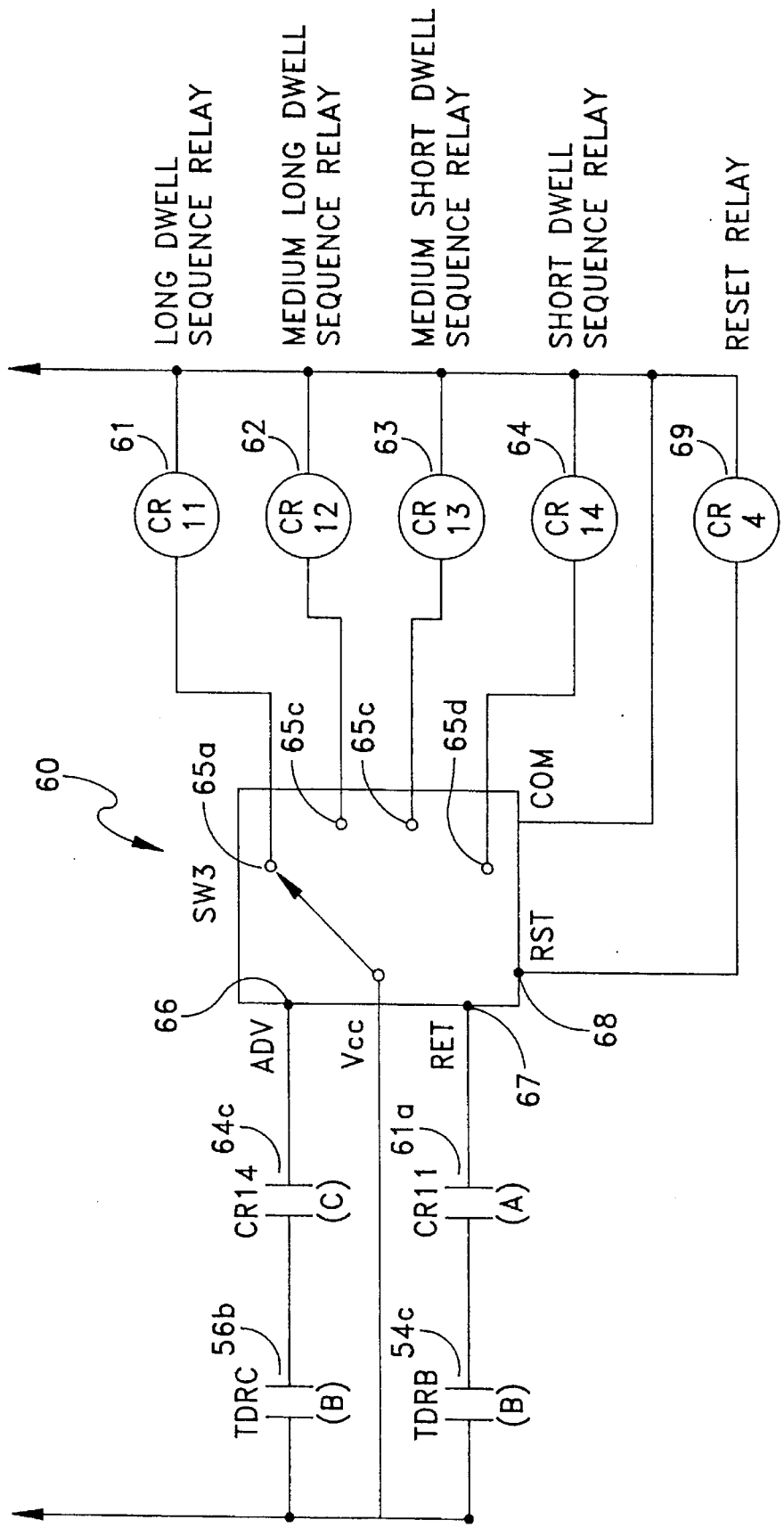
FIG. 4 is a schematic diagram illustrating how the sequencing control of the present invention steps from longer to shorter and from shorter to longer power impulses.

Referring now to FIGS. 2 and 4, the operation of the circuit that controls the seal jaws and the heat to the seal wire will be described. In this description the illustrations and the explanation are in the form of relay type logic which is universally and easily understood. In the preferred embodiment, much of the logic is programmed into a programmable logic controller. Once the following description is understood, anyone skilled in the art of programmable logic controllers will be able to affect the same results as the described embodiment.

The seal cycle is initiated by activating seal button 50. Power flows to the now closed contacts of 50, through the normally closed contacts 56a of TDRC and energizes the jaw closed relay 51. Relay 51 locks itself in through contacts 51a and will stay locked in until contacts 56a open. Simultaneously, contacts 51b close energizing solenoid 57 and solenoid 57 operates a pneumatic valve to close the seal jaws of the machine. Upon closure of the jaws, seal jaw switch 59 is activated, thereby sending power to seal cycle relay 52. Upon activation of relay 52, contacts 52a close starting the high heat impulse timer 53. Simultaneously, normally closed contacts 52b open to reset the time between seals timer 54.

Similarly, contacts 52c close sending power through normally closed contacts 53a and 55a to energize the high heat relay 58. When high heat relay 58 energizes, it closes contacts 37 and opens contacts 36 on FIG. 3 to initiate the high heat impulse on the sealing wire.

Contacts 52d close to initiate the jaw dwell after heat cycle timer 56. However, normally closed contacts 58c will have opened when relay 58 pulled in previously so that the jaw dwell after heat cycle timer does not yet start its time cycle. Simultaneously, with the operation of high heat relay 58, contacts 58a close to initiate the timing of the wire safety timer 55. Wire safety timer 55 is set for the maximum allowable impulse time on the wire which will not cause damage to the wire or the machine. In the event of malfunction of the circuit, once the timer 55 times out contacts 55a will open dropping out relay 58, thereby returning the heat to its standby setting by releasing contacts 37 and closing contacts 36 in FIG. 3.

The duration of the high heat impulse to the seal wire is controlled by the length of time on the high heat impulse timer 53. Once timer 53 times out, it opens contacts 53a releasing relay 58 which controls the high heat. The longer the setting on timer 53, the longer the impulse will be. The time setting on timer 53 is determined by the resistance in the timing circuit such that the higher the resistance, the longer the time setting for timer 53a; and the shorter the resistance, the shorter the time setting on 53a. It should be noted that the time setting for the time between seals timer 54 is controlled in a similar manner to timer 53. A series of resistances with relay contacts 62a, 63a and 64a capable of shorting various portions of the resistance from the timing circuit of high heat impulse timer 53 provide a means of setting longer or shorter times into timer 53. Similarly relay contacts 62b, 63b, and 64b capable of shorting various portions of resistance in the timer circuit to provide a means of setting longer or shorter times into timer 54. Thus the contacts for relay 62 can short one-fourth of the resistance, the contacts for relay 63 can short two-fourths (one-half), and the contacts for relay 64 can short three-fourths of the resistance from each respective timer thereby reducing the resistances and shortening the set time. It should be noted that the percentage of resistance shorted at each stage need not be the same, but can be adjusted for best results operationally.

Turning now to FIG. 4, there is shown a step switching device generally indicated at 60 which advances one step upon connection to a power impulse at advance (ADV) terminal 66 and retards one step upon connection of a power impulse to retard (RET) terminal 67. Each time a step is made in either direction, an impulse of short duration (approximately 100 milliseconds) emanates from reset (RST) connection 68 to energize reset relay 69 for a momentary pulse.

When a seal is made, as stated earlier, contacts 52a initiate high heat impulse timer 53 and, normally closed contacts 52b, open to de-energize time between seals timer 54. If the machine is cold, rotary switch 65 will be in the position shown and power flows through contact 65a to energize the long dwell sequence relay 61. Normally closed contacts 61a will have been opened previously to prevent the rotary switch from retarding any farther. Since relays 62, 63, and 64 are not closed in, timer 53 is set on its longest heat setting and a long impulse is imposed across the seal wire. When the long high heat impulse is completed, contacts 53a open deactivating high heat relay 58 which opens contacts 37 and closes contacts 36 returning the seal circuit to its low heat setting. Normally closed contacts 58c close, initiating the jaw dwell after heat cycle timer 56. As soon as timer 56 times out, contacts 56a open which releases the jaw closed relay 51 opening contacts 51b to release the jaw close solenoid 57 permitting the seal jaw to open. As the seal jaw opens, it opens seal jaw switch 59 releasing jaw close relay 52. This opens contacts 52a to reset the high heat impulse timer and closes contacts 52b to commence the timing of the time between seals timer 54. Also, when timer 56 times out, contacts 56b shown on FIG. 4 close, allowing power to pass through normally closed contacts 64c to energize the advance terminal (ADV) 66 and advance the rotary switch clockwise to position 65b. At this point, power is now flowing through 65b to energize medium long dwell sequence relay 62. Relay 62 closes contacts 62a thereby shorting out the first stage resistor, reducing the time on timer 53 and closes contacts 62b shorting out the first stage resistor, reducing the time on timer 54.

Time between seals timer 54 is now timing out since contacts 52b closed when the seal jaw opened. If another product arrives at the machine and a seal is commenced prior to the timer timing out, the rotary switch will stay at position 65b and contacts 62a will continue to short out the first stage on high heat impulse timer 53, thus reducing the impulse time of the seal wire. Thus, for the next seal being made, a shorter impulse will be sent to the seal wire. If, however, timer 54 times out prior to another seal being made, contacts 54b will close and power will flow through normally closed contacts 61a to the retard terminal (RET) 67 of rotary switch 65 thus retarding it to position 65a. This in turn releases the medium long time relay 62 opening contacts 62a and returns timer 53 to the long dwell sequence.

In a similar manner, it will be seen that as continuing seal cycles are made and packages arrive prior to the timing out of time between seals relay 54, the rotary switch will step from position 65a, to 65b, to 65c, to 65d each time another seal is made, thereby incrementally shortening the time duration that sealing power is applied to the seal wire. This occurs because the jaw dwell timer contacts 56b close every time the seal is made and the impulse will continue to advance the rotary switch. Once the rotary switch reaches position 65d, it will energize short dwell sequence relay 64, which in addition to operating the shunting contacts 64a and 64b, will also open normally closed contacts 64c, thereby preventing the switch from rotating any farther as more seals are made. Since there are no more positions on the switch being used, it should not be permitted to advance any farther.

It should also be noted that in the event that the rotary switch were on position 65d, and product were not to arrive in sufficient time before time between seals timer 54 timed out, then contacts 54b would close and retard the switch to position 65c. As the switch moved from one position to the next, a power impulse would be transmitted out of reset output 68 to energize reset relay 69. Relay 69 would momentarily open normally closed contacts 69a, thereby resetting time between seal timer 54. Timer 54 would commence its timing again, and if a seal cycle still has not been initiated prior to its timing out, would again energize contacts 54b to step rotary switch 65 back to position 65b. Again, the reset relay 69 would reset timer 54 and, upon timing out the rotary switch, would step back to position 65a at which point the long dwell sequence relay 61 would be energized, thereby opening normally closed contacts 61a and preventing further steps back.

It should also be noted that as the rotary switch step advances progressively and relays 62, 63, and 64 are activated the high heat impulse time, as controlled by timer 53, is incrementally shortened and also, the time between seals as controlled by timer 54 is incrementally shortened. Thus, the length of the high heat impulse becomes shorter and so, too, does the length of time permitted between seals become shorter as packaging speed increases. This, in effect, achieves a uniform duty cycle in which the total percentage of time that high heat is supplied to the seal wire over a period of time stays relatively uniform regardless of packaging speed.

Thus, it will be seen that the apparatus of the present invention permits a seal wire to run with a long duration impulse when the machine starts, and if seals are being made infrequently to remain at the long duration setting. As the machine speeds up the duration of the sealing impulse will decrease incrementally until the duration becomes proper for the speed of the machine. Thus, the faster the machine runs (the more impulse cycles per minute), the shorter the heat cycles will become. On the other hand, if products fail to arrive at the machine and the machine sits idle between heat impulses for too long, the circuit will step back incrementally to longer and longer impulse cycles. Thus, a brief interruption of product will result in a small increase in impulse duration; whereas, a prolonged interruption of production will result in the system returning to the long dwell setting.

The description herein shows four stages of heat impulse dwell and four stages of time between seals. In practice, it has been found that several more stages can be easily incorporated and are beneficial, and these are easily added by adding more positions to the rotary switch between position 65c and position 65d, by adding more relays controlled by the rotary switch, and by adding more (and smaller) resistors to the timing circuits of timers 53 and 54. It will be appreciated by those skilled in the art that various other changes and modifications can be made to the illustrated embodiments without departing from the spirit of the present invention. All such modifications and changes are intended to be covered by the appended claims.

What is claimed is:

1. In an apparatus for sealing thermoplastic film having at least one sealing jaw including a seal wire wherein the temperature of the wire is controlled by a control apparatus that provides a series of power impulses the duration of which is responsive to the rapidity of the sealing jaw operation comprising:

means for applying power for a first time period;

means for applying power for a second time period shorter than the first and responsive to the initiation of another seal cycle within a preset time period;

means for applying power for a third time period shorter than the second time period responsive to the initiation of another seal cycle within a second preset time period;

wherein said power supplying means continues to operate such that it steps to the shorter incremental time periods as the apparatus operates and wherein a break in the flow of product causing the seal jaw to rest, causes the power supplying means to move from the third time period power means to the second time period power means and thence to the first time period power means in sequence until product causes initiation of jaw operation.

2. A method of controlling the temperature of a sealing wire heating element comprising:

(a). applying a power to the seal wire for a first impulse time, (b). sequentially applying power to the seal wire in decreasing time intervals as long as the wire is sealing product within preset time spaces, (c). sequentially applying a power to a seal wire in increasing time intervals when the seal wire is not sealing product within the preset time spaces, (d). repeating steps b and c as indicated in response to the rate of operation of the sealing wire.

3. An apparatus for sealing thermal plastic film having at least one sealing jaw and an electrically heated seal wire for sealing together two layers of film, a power supply and means for controlling the power applied to the wire, said control means providing a series of electrical impulses of variable duration across the sealing wire, the total duration of the sum of said long, intermediate and short impulses remaining substantially constant over a period of time.

4. In an apparatus for sealing thermoplastic film, said apparatus having at least one sealing jaw including an electrically heated seal wire for sealing together two layers of film along the length of said wire, the temperature of said wire being controlled by the power setting and duration of an electrical impulse across said wire during the process of sealing said film, a seal wire temperature control system, comprising:

a power supply means for supplying said electric power for said seal wire;

a switching means for applying said power to said wire during the sealing cycle;

a long impulse timer means for controlling the duration of said electrical impulse applied to said wire by said switching means during said sealing cycle;

an intermediate impulse timer means for controlling the duration of said electrical impulse applied to said wire by said switching means during said sealing cycle;

a short impulse timer means for controlling the duration of said electrical impulse applied to said wire by said switching means during said sealing cycle;

means responsive to the duration of time since the previous seal for transferring the control of the duration of said electrical impulse from said long impulse timer means to said intermediate impulse timer means;

means responsive to the duration of time since the previous seal for transferring the control of the duration of said electrical impulse from said intermediate impulse timer means to said short impulse timer means;

a first transition means for transferring the control of the duration of said electrical impulse from said short impulse timer means to said intermediate impulse timer means responsive to detection of the absence of packages after the expiration of a set time; and a second transition means for transferring the control of the duration of said electrical impulse from said intermediate impulse timer means to said long impulse timer means responsive to detection of the absence of packages after the expiration of a second set time.

5. The apparatus of claim 4, wherein said first transition timer means has a duration shorter than said second transition timer means.

6. The apparatus of claim 4, wherein the duration of said long impulse timer means, said intermediate impulse timer means, said short impulse timer means, said first transition timer means and said second transition timer means are adjustable.

7. In an apparatus as in claim 4, wherein means are provided to adjust the power setting of said electrical impulses applied across said seal wire by said switching means to regulate the temperature of said seal wire.

8. A method for controlling the seal wire temperature for sealing thermoplastic film about a sequence of packages in an apparatus having at least one sealing jaw including an electrically heated seal wire for sealing together two layers of said film along the length of said wire, the temperature of said wire being controlled by the power setting and duration of an electrical impulse across said wire during the process of sealing said film, comprising the steps of:

providing a power supply means for supplying said power for said seal wire;

providing a switching means for applying said power to said wire during the sealing cycle;

providing a long duration timer for controlling the duration of said electrical impulse applied to said wire by said switching means during said sealing cycle;

providing an intermediate duration timer for controlling the duration of said electrical impulse applied to said wire by said switching means during said sealing cycle;

providing a short duration timer for controlling the duration of said electrical impulse applied to said wire by said switching means during said sealing cycle;

transferring control of the duration of said electrical impulse from said long duration timer to said intermediate duration timer upon completion of a sealing cycle;

transferring control of the duration of said electrical impulse from said intermediate duration timer to said short duration timer upon completion of a sealing cycle a successive package being present at said seal wire within a predetermined period of time;

transferring control of the duration of said electrical impulse from said short duration timer to said intermediate duration timer upon the absence of a successive package at said seal wire after expiration of said second predetermined period of time;

transferring control of the duration of said electrical impulse from said intermediate duration timer to said long duration timer upon the absence of a successive package at said seal wire after expiration of said first predetermined period of time.

9. The method of claim 8, further comprising the step of:

providing means to adjust the power setting of said electrical impulses applied across said seal wire by said switching means to regulate the temperature of said seal wire.

10. The method of claim 8, further comprising the step of:

applying a low power across said seal wire during those periods of time when said electrical impulses are not applied across said wire.

* * * * *